United States Patent [19]

Clark

[11] 4,023,852
[45] May 17, 1977

[54] TILTABLE VEHICLE LOADING RAMP

[76] Inventor: Gary E. Clark, Rte. 2, Box 262 A, Shelbyville, Ky. 40065

[22] Filed: Apr. 2, 1976

[21] Appl. No.: 673,146

[52] U.S. Cl. .................................. 296/61; 214/77 P
[51] Int. Cl.² ............................................ B60P 1/26
[58] Field of Search .......... 296/61; 214/77 R, 77 P, 214/80, 85, 85.1

[56] References Cited

UNITED STATES PATENTS

| 2,715,470 | 8/1955 | Marcus | 214/77 P |
| 3,441,153 | 4/1969 | Handley | 214/85 |
| 3,675,800 | 7/1972 | Weyant | 296/61 |
| 3,799,373 | 3/1974 | Randall | 214/77 P |

Primary Examiner—Robert R. Song
Assistant Examiner—John A. Carroll

[57] ABSTRACT

A tiltable rear bed portion of a flat bed vehicle including a pair of slotted restraining arms disposed under and along a pair of parallel, spaced bed supporting frames. The arms are pivotally attached on their rear ends to vertical support arms suspended from the frame members on the rear bed portion and are slidably disposed through rectangular slots in a pair of vertical support arms suspended from the frame members on the horizontal forward bed portion. The restraining arms are slotted on the underside of their forward end portions to securely lock within the forward vertical support arms when the rear bed portion is in the horizontal load carrying position. A steel pull rod actuated rocker arm assembly is manually operated by a lever to lift the restraining arms clear of their locked restraining positions in the forward support arms to permit the restraining arms to slide forward through the forward vertical support arms as the rear bed portion is lowered from the horizontal load carrying position to an inclined loading position.

9 Claims, 9 Drawing Figures

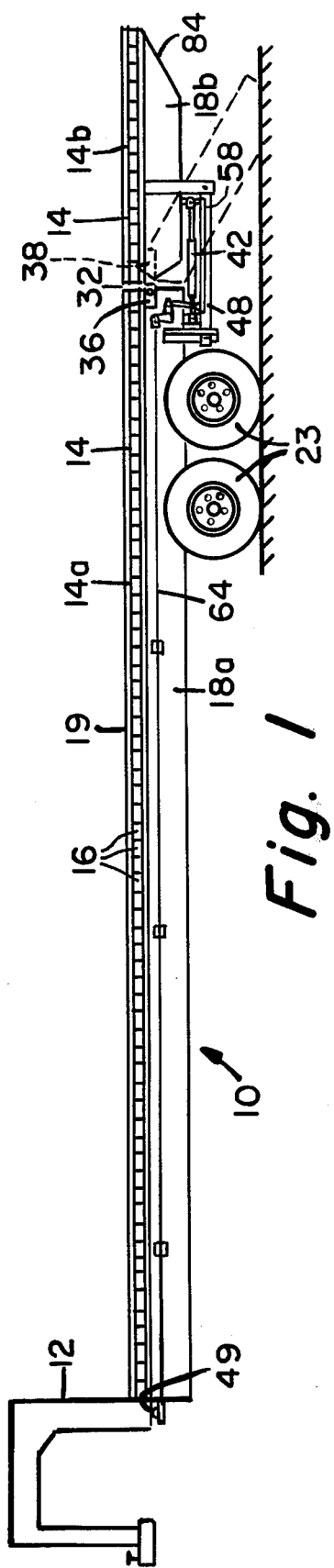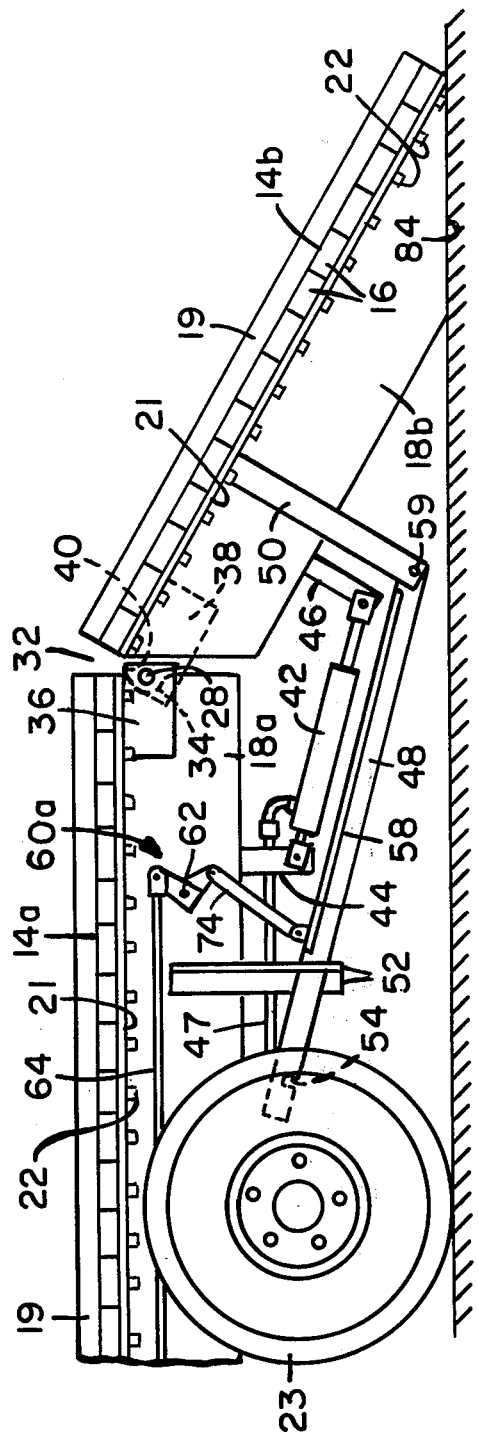

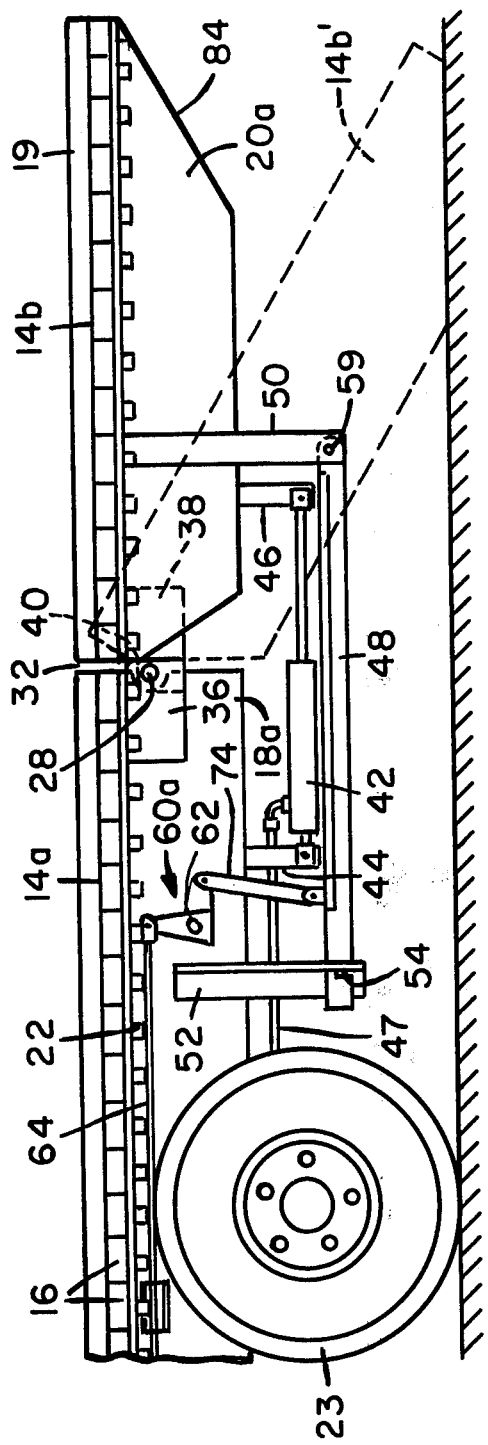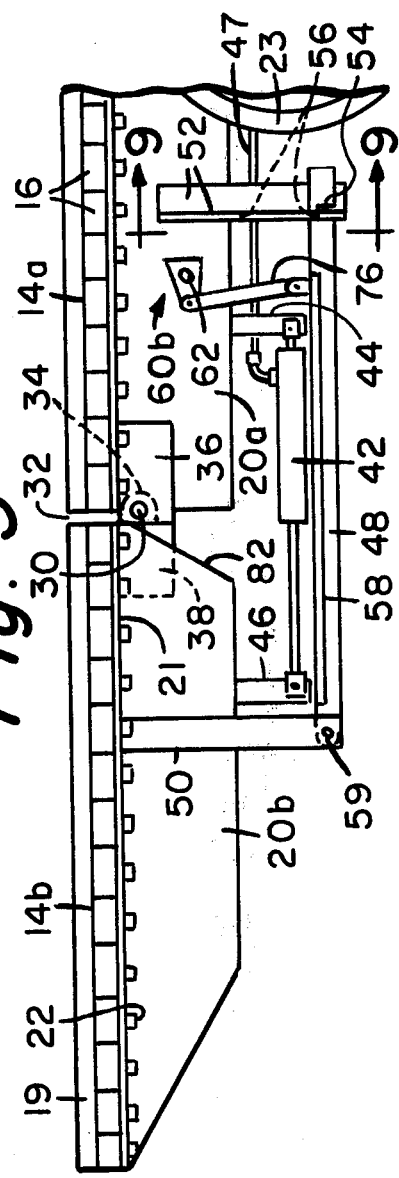

TILTABLE VEHICLE LOADING RAMP

BACKGROUND OF THE INVENTION

This invention relates generally to rear loading ramp assemblies for flat bed vehicles such as trucks trailers and the like and to the means for locking said assemblies securely in a horizontal load carrying position as well as for lowering them to an inclined loading or unloading position. The subject invention is characterized by simple construction using readily available component parts.

Tiltable rear loading ramp assemblies for flat bed vehicles are generally known to the prior art. For example, see U.S. Pat. No. 3,441,153 issued to D. D. Handley on Apr. 29, 1969 entitled, "Modified Flat Bed Truck." However, the pivot pin assembly about which the rear portion of the truck bed is tilted from the horizontal load carrying position to an inclined loading position as disclosed in the reference patent is relatively complex in construction. Moreover, the assembly requires a triangular shaped bracket undermounting the truck frame near the pivotal joint of the truck bed which, because of its position, may require being suspended below the truck axle in most cases to provide the necessary strength to hold the rear bed portion in its inclined loading position. The suspension of such a bracket below the truck axle constitutes an obstruction which may present difficulties in driving the truck over rough uneven ground such as is often found on construction job sites.

My invention is adapted to substantially overcome these and other difficulties previously encountered with vehicle loading ramps used in the prior art.

SUMMARY OF THE INVENTION

Briefly, in accordance with my invention, there is provided a loading ramp assembly for a flat bed vehicle such as a truck, trailer or the like including a stationary horizontal forward bed portion and a tiltable rear bed portion pivotally attached to said horizontal bed portion. A trame means is provided for supporting the forward and rear bed portions independent of one another. A first support arm is attached to and suspended beneath the frame means of the forward bed portion defining a slot therethrough. A second support arm is attached to and suspended beneath the frame means of the rear bed portion. An elongated restraining arm is pivotally connected on one end to the second support arm and is slidably disposed through the slot on the first support arm. The restraining arm defines a slot therein which is adapted to seat securely in the slot in the first support arm when the rear bed portion is in a horizontal load carrying position.

These and other specific object of my invention will become apparent to those skilled in the art from the following detailed description and attached drawings upon which, by way of examples, only the preferred embodiments of my invention are illustrated.

BRIEF DESCRIPTION OF THE DRAWINGS

FIG. 1 is a side elevation view of a flat bed trailer having a tiltable rear loading ramp which, when locked in a horizontal position, defines a part of the trailer bed, illustrating one preferred embodiment of the subject invention.

FIG. 3 is an enlarged side elevation view of the tiltable rear loading ramp portion of the trailer of FIGS. 1 and 2 shown in the horizontal load carrying position.

FIG. 4 is an enlarged side elevation view of the tiltable rear loading ramp portion of the trailer of FIGS. 1 and 2 shown in the inclined loading position.

FIG. 5 is a enlarged side elevation view of the tiltable rear loading ramp portion of the trailer of FIGS. 1 and 2 as seen from the side opposite that shown in FIGS. 3 and 4.

DESCRIPTION OF THE PREFERRED EMBODIMENT

Figure 2:
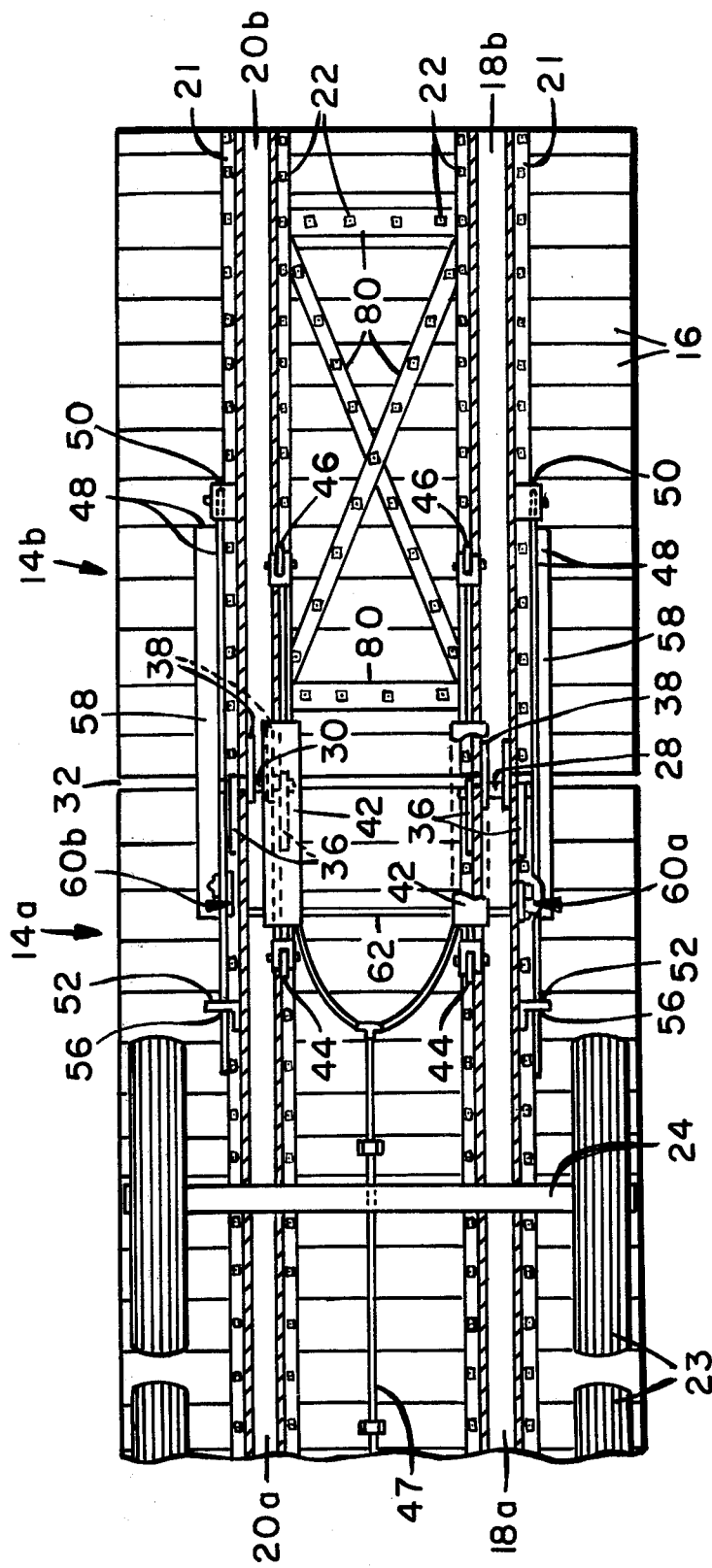
FIG. 2 is a bottom view of the tiltable rear loading ramp portion of the trailer of FIG. 1.
Figure 6:
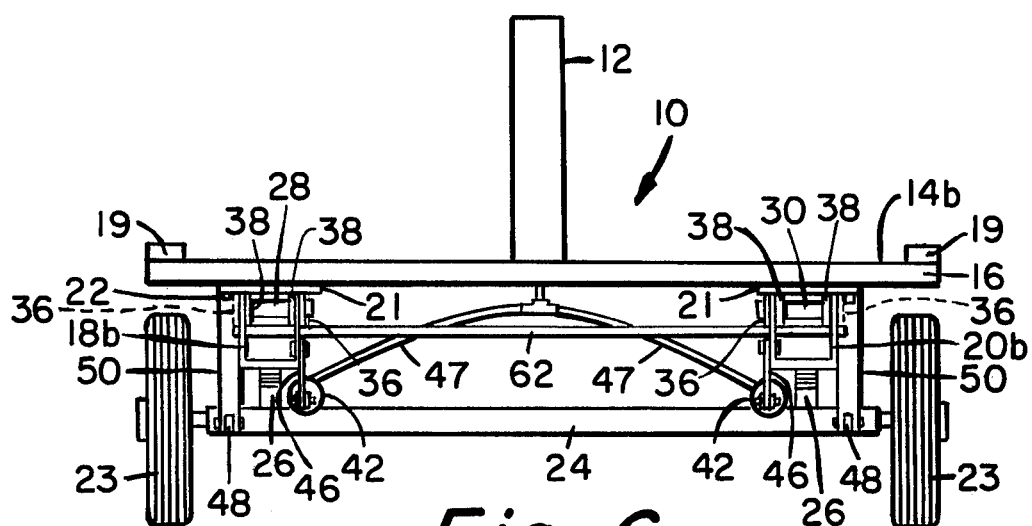
FIG. 6 shows a rear end elevation view of the trailer of FIGS. 1 and 2.
Figure 7:
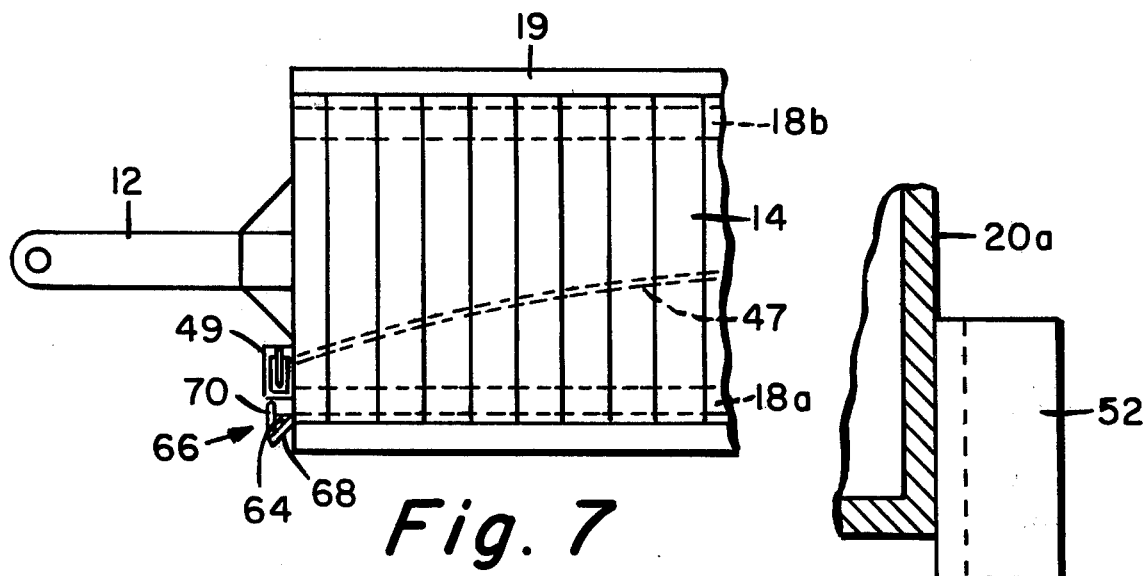
FIG. 7 is a top view of a front portion of the trailer of FIGS. 1 and 2.

Referring now to the Figures there is shown a trailer 10 for hauling materials, equipment, implements and the like. A suitable hitch 12 is provided for connecting the trailer 10 to a power driven towing vehicle, not shown.

The trailer 10 includes a bed 14 having a horizontal forward portion 14a and a tiltable rear portion 14b constructed of a series of 2 × 4 inch wooden planks 16 layed side by side across a pair of box shaped steel frames 18a,b and 20a,b of hollow rectangular cross-section. A pair of plates 19 formed from 2 × 4 inch boards may also be disposed parallel to one another along the sides of the trailer 10 to prevent materials and equipment from sliding or rolling off the bed 14. The frames 18 and 20 include a pair of forward frame members 18a and 20a which support the forward horizontal bed portion 14a, and a pair of rear frame members 18b and 20b which support the tiltable rear bed portion 14b. The frames 18 and 20 are disposed parallel to one another and may be constructed by welding elongated rectangular plates of steel together to form the hollow rectangular cross-section. A top plate 21 of the frames 18 and 20 is provided with greater width than that of the hollow box shaped portion to produce a flanged edge portion extending along the length of the frames 18 and 20 through which a series of bolts 22 may be inserted to fasten the frames 18 and 20 to the various overlying wooden planks 16. A set of wheels 23 are joined by means of axles 24 upon which the frames 18 and 20 are connected by the usual vehicle suspension springs 26.

The rear tiltable bed portion 14b is pivotally joined to the forward horizontal bed portion 14a by means of a pair of suitable heavy duty pivot pins or shafts 28 and 30 located just under and slightly forward of a gap 32 between the forward and rear portions 14a and 14b. The shafts 28 and 30 are connected through pairs of plates 36 welded to the outside vertical walls of the forward frame members 18a and 20a, respectively, and pairs of plates 38 welded to the inside vertical walls of the rear frame members 18b and 20b, respectively. The plates 36 project rearward beyond the rear ends of the forward frame members 18a and 20a across the gap 32 to a position just forward of the front end of the plate 21 on the rear frame members 18b and 20b such that the upper rear corners of the plates 36 will not catch or bind against said plate when the rear portion 14b is tilted downward from the horizontal to the loading position. The plates 38 project forward beyond the front ends of the rear frame members 18b and 20b across the gap 32 so as to overlap the rear end portions of the plates 36. The plates 38 have upper forward corners 40 which are rounded so that they will not catch or bind against the rear ends of the forward frame members 18a and 20a when the plates 38 and rear portion 14b are pivoted about the pins 28 and 30. In the alternative, the pins 28 and 30 may be replaced by a single elongated pivot pin or shaft extending along and beneath the gap 32 through and between the plates 36 and 38 on both frames 18 and 20. The pair of pins 28 and 30 are preferred over a single elongated pivot pin because less steel is required to form the pivotal joints and because their smaller length makes breakage less likely. To minimize the spacing or width of the gap 32, the pins 28 and 30 may be disposed slightly forward of the gap 32 in notches 34 formed in the rear ends of the forward frame members 18a and 20a (See FIGS. 4 and 5).

The rear portion 14b is raised from the tilted loading position as shown in FIG. 4 to the horizontal load carrying position as shown in FIG. 3 by means of a pair of hydraulic rams 42 pivotally connected between vertical steel support arms 44 and 46 attached to the forward frame members 18a, 20a and the rear frame members 18b, 20b, respectively. The arms 44 and 46 may be welded or bolted to the vertical walls of the frame 18 and 20 opposite one another interior of the bed 14, and should carry the rams 42 at approximately the level of the axles 24, more or less, when the rear portion 14b is in the raised load carrying position. Hydraulic fluid is supplied to the rams 42 through a line 47 from a conventional hydraulic hand pump and reservoir 49 located conveniently at the front of the trailer 10. In the alternative, a pair of air operated rams or any other suitable lifting means could be used in place of the rams 42 of the present example. Such lifting means may also be power driven as well as hand operated provided a suitable power source such as a compressor is available. Such power driven lifting means may readily be employed where the tiltable bed of the instant invention is employed on a truck or other powered vehicle.

The tiltable rear portion 14b is held in the horizontal load carrying position by a pair of slotted restraining arms 48 preferably formed of steel angle iron and disposed beneath the frames 18 and 20. The arms 48 are pivotally connected to vertically projecting steel support arms 50 welded or bolted to the vertical sidewalls of the rear frame members 18b and 20b and their opposite end portions are slidably inserted through rectangular notches 56 located in a pair of vertical support arms 52, preferably formed of angle iron, and welded or bolted to the outer sidewalls of the forward frame members 18a and 20a. The arms 48 contain rectangular notches 54 near the slidable free ends thereof adapted to closely fit within the slots 56 of the arms 52 when the tiltable rear portion 14b is in the horizontal load carrying position (See FIGS. 3 and 5). Thus the restraining arms 48 are adapted to carry the full weight of the rear portion 14b when in the load carrying position so that the rams 42 are not used except to lift the rear portion 14b from the loading position to the load carrying position. The horizontal surfaces 58 of the arms 48 are cut away at both ends so that the pivotal ends are free to rotate about pivot pins 59 in the arms 50 and so that the slidable ends containing the notches 54 are free to slide back and forth through the rectangular slots 56 in the arms 52 from an extended loading position as shown in FIG. 4 to a retracted load carrying position as shown in FIGS. 3 and 5.

To lower the rear portion 14b from a horizontal load carrying position as shown in FIGS. 3 and 5 to an inclined loading position as shown in FIG. 4, a pair of rocker arms 60a and 60b fixedly connected to opposite ends of a rotatable shaft 62 are employed. The rocker arm 60a is a generally L-shaped member connected to the end of the shaft 62 immediately beyond the outside vertical wall of the forward frame member 18a. A steel pull rod 64 is pivotally connected at one end to the top of the L-shaped rocker arm 60a and extends forward along the sidewall of the frame member 18a to a hand operated lever assembly 66 conveniently located on the front end of the trailer 10 (See FIG. 8). The assembly 66 includes a fixed arm 68 pivotally connected to one end of the lever arm 70. The other end of the pull rod 64 is pivotally connected to the lever arm 70 between the pivotal and free end thereof. The end of the horizontal portion of the L-shaped rocker arm 60a is pivotally connected to one end of a steel lifting arm 74, the other end of which is pivotally connected to the restraining arm 48.

Figure 8:
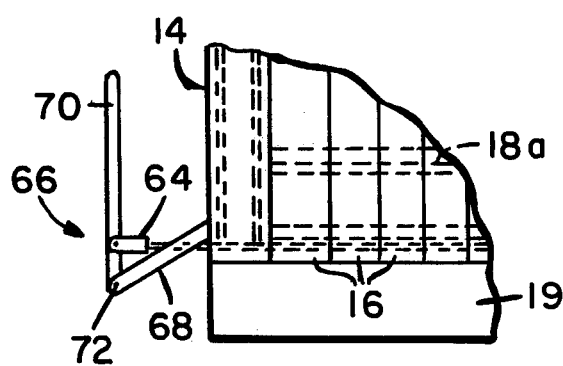
FIG. 8 shows an enlarged top view of a front left corner portion of the trailer of FIGS. 1 and 2.
Figure 9:
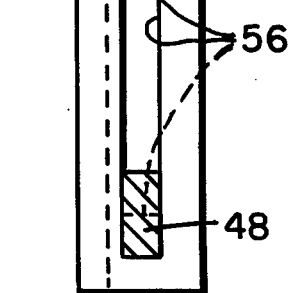
FIG. 9 shows an enlarged cross-sectional view of a slotted vertical support arm containing a notched restraining arm therein as seen along lines 9—9 of FIG. 5.

Accordingly, the rear portion 14b is lowered to the loading position by pulling the lever 70 through a counterclockwise arc, which in turn, pulls the pull rod 64 forward to rotate the rocker arm 60a counterclockwise to lift the arm 74. As the arm 74 lifts the restraining arm 48, the notch 54 is also lifted to allow the weight of the rear portion 14b to push the arm 48 forward through the slot 56. As the arm 48 slides forward through the slot 56, the arm 74 pulls the rocker arm 60a around through a clockwise arc, which in turn, pulls the rod 64 rearward to return the lever arm 70 to a retracted position as shown in FIG. 8. The arm 60b, fixedly connected to the other end of the rotatable shaft 62, follows the action of the rocker arm 60a to lift an arm 76 pivotally connected to the arm 48 which is disposed beneath the frame 20. The arm 60b is thus a follower assembly as opposed to the arm 60a which is a active assembly controlled by the pull rod 64. Since the follower rocker arm 60b is operated by the rotation of the shaft 62 rather than a push rod, it is of simpler construction than the L-shaped rocker arm 60a.

The typical operation of the loader of the instant example is as follows. Assume that the rear portion 14b is tilted in the loading position as shown in FIG. 4. The arms 48 are in an extended position in the slots 56 of the arms 52. The hydraulic pump 49 is activated to energize the rams 42 to lift the rear portion 14b toward the horizontal. The rear portion 14b thus rotates counterclockwise (FIG. 4) until it reaches the horizontal load carrying position wherein the slot 54 drops in the slot 56 (FIGS. 3 and 5). The pressure is then released from the rams 42 so that the arms 48 carry the entire load of the rear portion 14b. To lower the rear portion 14b, the rams 42 are again energized by the pump 49 until the rams 42 assume the load of the rear portion 14b previously carried by the arms 48. A slight upward tilt of the rear portion 14b through a counterclockwise arc may result. With the load released from the arms 48 and being assumed by the rams 42, the pull rod 64 is pulled forward by the lever assembly 66 (FIG. 8) to rotate the rocker arms 60a and 60b to lift the slots 54 of the arms 48 clear of the slots 56. At the same time, hydraulic pressure may be partially released at the pump 49, to allow the weight of the rear portion 14b to force the arms 48 forward through the slots 56 by gravity. The rate at which the rear portion 14b tilts toward the ground can be controlled quite readily by the rate at which hydraulic pressure is released from the rams 42 by the operator of the pump 49.

The length of the rear portion 14b should preferrably be such that the angle of the ramp with the ground is not too steep. Otherwise driving equipment up the ramp onto an horizontal forward portion 14a may become a problem and low slung equipment may tend to drag as it crosses the angle at the gap 32. I have found that a loading angle of no greater than about 30° with the horizontal permits safe loading and unloading of a wide variety of vehicles and equipment onto the trailer 10. To avoid twisting of the rear portion 14b when lowering the same onto uneven ground, I recommend reinforcing the bottom of the rear portion 14b with steel cross bracing 80 such as shown in FIG. 2. The forward ends 82 of the rear frame members 18b and 20b should be tapered diagonally rearward of the gap 32 so that the ends 82 fit approximately flush with the rear ends of the forward support members 18a and 20a when the rear portion 14b is in the loading position as shown in FIG. 4. Similarly, the rear ends 84 of the rear support members 18b and 20b should be tapered diagonally downward and forward at the anticipated loading angle of the tiltable rear portion 14b.

Those skilled in the art will appreciate that my invention is equally applicable to use in connection with trucks, wagons and the like, as well as trailers. The rams 42 can also be used to tilt the rear portion 14b upward through an angle above the horizonal to allow rear loading of the trailer 10 from loading docks which are higher above the ground than the horizontal bed portion 14.

Although the subject invention has been described with respect to specific details of a certain preferred embodiment thereof, it is not intended that such details limit the scope of my invention except insofar as set forth in the following claims.

I claim:

1. A loading ramp assembly for a flat bed vehicle such as a truck, trailer, and the like, comprising
   a stationary horizontal forward bed portion,
   a tiltable rear bed portion pivotally attached to said horizontal bed portion,
   frame means for supporting said forward and rear bed portions independent of one another,
   a first support arm attached to and suspended beneath said frame means of said forward bed portion defining an opening therethrough,
   a second support arm attached to and suspended beneath said frame means of said rear bed portion, and
   an elongated restraining arm pivotally connected on one end to said second support arm and slidably disposed through said opening in said first support arm, said restraining arm defining a slot therein adapted to lock said restraining arm in a fixed position in said first support arm when said rear bed portion is in a horizontal load carrying position, said restraining arm being slidable forward through said opening when said slot is disengaged from the opening defining portion of said first support arm and when said rear bed portion is tilted downward from said horizontal load carrying position toward an inclined loading position.

2. The assembly of claim 1 wherein said restraining arm is suspended beneath said frame means no lower than a lowest axle of said vehicle.

3. The assembly of claim 1 further comprising means for lifting the forward end of said restraining arm to permit disengagement of said slot from said first support arm such that said restraining arm will slide forward through said opening as said rear bed portion is lowered from a horizontal load carrying position toward said inclined loading position.

4. The assembly of claim 1 wherein said restraining arm comprises an angle iron having a horizontal flange and a vertical flange, said horizontal flange extending along a central portion of the length of said arm less than the entire length of said arm such that only a forward portion of said vertical flange slidably engages said opening in said first support arm.

5. The assembly of claim 1 further comprising raising means connected between said forward and rear bed portions for tilting said rear bed portion from an inclined loading position to a horizontal load carrying position.

6. The assembly of claim 3 wherein said lifting means comprises
   a rocker arm pivotally connected to said frame means of said forward bed portion above said restraining arm,
   a lifting arm pivotally connected on one end to said rocker arm and pivotally connected on the other end of said restraining arm, and
   means for rotating said rocker arm relative to said forward bed portion to pull said lifting arm to raise said restraining arm so that the slot therein disengages said first support arm.

7. The assembly of claim 6 wherein said rocker arm is generally L-shaped, said rotating means comprising a pull rod pivotally connected on one end to one end of said rocker arm, said lifting arm being pivotally connected to the other end of said rocker arm.

8. The assembly of claim 1 wherein said frame means comprises
   a pair of elongated forward frame members having hollow rectangular cross-section, spaced apart from and disposed parallel to one another for supporting said forward bed portion,
   a pair of elongated rear frame members having hollow rectangular cross-section, spaced apart from and disposed parallel to one another for supporting said rear bed portion, said forward and rear pairs of frame members being in line with one another,
   a first pair of plates fixedly attached to the rear end portions of each of said forward frame members and projecting rearward beyond the rear ends of said forward frame members toward said rear frame members,
   a second pair of plates fixedly attached to the forward end portions of each of said rear frame members and projecting forward beyond the front ends of said rear frame members toward said forward frame members, the upper forward corners of said second pair of plates being rounded to permit said second pair of plates to tilt with said rear bed portion without binding against said forward bed portion, said first and second pair of plates on each of said frame members overlapping one another, and
   a hinge pin inserted through the overlapping portions of said first and second pairs of plates on each of said frame members.

9. The assembly of claim 8 wherein said hinge pin comprises a first and second member.

* * * * *